United States Patent [19]

Hastem-Müller

[11] Patent Number: 4,678,078
[45] Date of Patent: Jul. 7, 1987

[54] SLAT CONVEYOR BELT FOR SLAT CONVEYOR

[76] Inventor: Hugo S. Hastem-Müller, Oettinger Strasse 9, D-8860 Nördlingen, Fed. Rep. of Germany

[21] Appl. No.: 804,811

[22] Filed: Dec. 4, 1985

[30] Foreign Application Priority Data

Dec. 11, 1984 [DE] Fed. Rep. of Germany ....... 3445125

[51] Int. Cl.$^4$ ............................................. B65G 47/84
[52] U.S. Cl. .............................. 198/803.2; 198/690.2; 198/851
[58] Field of Search ...................... 198/690.2, 698, 699, 198/803.01, 803.2, 850, 851, 834

[56] References Cited

U.S. PATENT DOCUMENTS

| | | | |
|---|---|---|---|
| 3,231,070 | 1/1966 | Muller | 198/850 |
| 3,976,192 | 8/1976 | Muller | 198/803.2 |
| 4,078,654 | 3/1978 | Sarovich | 198/850 |
| 4,167,999 | 9/1979 | Haggerty | 198/803.2 |
| 4,589,543 | 5/1986 | Hastem-Muller | 198/699 |

FOREIGN PATENT DOCUMENTS 2714273  2/1978  Fed. Rep. of Germany ...... 198/699

Primary Examiner—Joseph E. Valenza
Attorney, Agent, or Firm—Dressler, Goldsmith, Shore, Sutker & Milnamow, Ltd.

[57] ABSTRACT

The invention relates to a slat conveyor belt for slat conveyors, which consists of several endless bands arranged adjacently spaced in conveyance direction, on the underside of which with equal spacing from one another transport ribs running transversely to the conveyance direction are arranged, which are designed for engagement with a driven transport roller, and which are provided with rest elements extending through holes in the belts to their upper side, to which the slats are fixable by emplacement in transverse and longitudinal direction. The rest elements comprise rest ribs parallel to the transport ribs, which are provided on their sides on the entire length with rest grooves, and that the slats present on their underside continuously two crosspieces running parallel in longitudinal direction with inward-point projections, and that on the slat or on the rest ribs there are provided several sharp raised parts which in the emplacing are pressed in each case into the other part and bring about the fixing of the slat in its longitudinal direction. The slats thereby require no previous processing, but need after the extruding only still to be cut to length. By arrangement of two further rest grooves above the first rest grooves the slat can be brought into a pre-set position, in which it can be adjusted in longitudinal direction before in the final emplacing operation the fixing occurs in longitudinal direction.

12 Claims, 3 Drawing Figures

SLAT CONVEYOR BELT FOR SLAT CONVEYOR

The invention relates to a slat conveyor band for slat conveyors, consisting of several endless belts arranged adjacently with spacing in the conveyance direction, on the underside of which there are mounted transport ribs running with equal distance apart, which are designed for engagement with grooves fitting them in at least one driven transport roller, and which are connected with rest elements extending through holes in the belts up to their upper side, on which the slats are fixable by positioning in transverse and longitudinal directions.

From German unexamined patent specification OS No. 23 23 601, there is known a slat conveyor with such a slat conveyor belt.

Such slat conveyors are used to a great extent in the textile industry in the production of fiber fleeces for the transport of the fibers, and are used, moreover, in virtually all areas of conveyance technology, for example, in the main service for transport of packages or in industrial machines and installations.

As carriers for the slats there are ordinarily service belts that are a few centimeters wide, and of which, depending on the width of the conveyor belt, at least, however, two belts are arranged adjacent to one another, to which the slats are fastened.

In the aforementioned slat conveyor described in DE-OS No. 23 23 601, there are provided push button nipples joined with the rest ribs, which nipples extend through holes in the belts, and on the underside of the slats, openings are provided, the openings and the push button means being formed and profiled in such a way that the slats can be emplaced on the nipples.

Through the fact that two push button connections per band are provided, any crooked running of the belt is effectively counteracted, and by use of two push button nipples the slat is fixed on the conveyor belt both in transverse and also in longitudinal direction.

With the known construction of the slat conveyor a disadvantage lies in that the slat profiles have still to be especially processed after the extrusion, for—since they have been cut to length—in the places where the emplacement is to be made, they have to be provided with holes, in which conection a high degree of care has to be applied so that the holes will correspond exactly to the place of the push button nipples or the rest strips.

A further disadvantage lies in that the push button nipples are constructed spherically and thereby in connection with the emplaced slats lead to a relatively great construction height of the entire belt.

In the textile industry, it is usual practice to arrange several transport belts in the stories one over another. A reduction of the construction height of the conveyor belts, which affects both the upper belt side and also the lower one, leads, therefore, directly to an increase in the conveying capacity, because then more belts can be arranged one over another.

Underlying the invention is the problem of creating a slat conveyor belt of the type mentioned at the outset, in which a subsequent tooling of the slats is eliminated, and in which the construction height can be reduced.

The problem is solved according to the invention by the means that the rest elements are constructed as two rest ribs parallel to the transport ribs, which rest strips are provided on the entire length with rest means, so that above the rest grooves rest lugs are formed. The slats present on their underside continuously two crosspieces running parallel in longitudinal direction, on the lower end of which in each case there is arranged an inward-pointing projection. The crosspieces and the projections are arranged and dimensioned in such a way that the slats are positionable over the rest lugs from above into the rest grooves, and that on the slat or on the rest ribs there are provided several sharp raised parts which in the emplacing press into, in each case, the other part and brings about the fixing of the slat in its longitudinal direction.

With the invention it is possible, therefore, to use the slats as they come out of the extruder, for they need only to be cut to length and can then be positioned and set in place on the rest strips.

In development of the invention, in the rest strips above the rest grooves inside the rest lugs there is provided in each case a second rest groove, the depth of which is less than the depth of the first rest groove.

There the distance of the second rest groove from the first rest groove is such that in the emplacing of the slat into the second rest grooves the raised parts still lie free.

It is hereby possible to bring each slat into a preliminary rest position in the second rest grooves, in which the slat can be shifted in its lengthwise direction, until it presents its prescribed position, and then by pressure on the slat the lodging in the lower rest groove can be brought about, in which process, then, the raised parts become effective and bring about a permanent deformation in the other element participating in the emplacement.

A preferred form of execution consists in that on the bottom of the first rest grooves there is provided in each case at least one raised part running into a sharp edge, the edge running perpendicular to the sidewalls of the groove.

When on the upper side of the rest strips there is provided in each case a groove running centrally and parallel to their longitudinal direction, into which a spring mounted on the underside of the slat between the crosspieces engages in closed form, the raised parts can also be arranged on the underside of the spring or in the groove.

It is advantageous to spray the transport ribs and the rest ribs onto the belt in the plastic injection molding process, after holes have first been stamped into this, so that the transport ribs and the rest ribs form a common part, whereby the manufacture of the slat conveyor belt can be considerably simplified. In order to exercise their function, however, the bands must present a considerable tensile strength. Suitable for this are fabrics of polyester fibers in which the holes can be produced without difficulties by stamping or welding. In more recent time, plastics have been developed which have both an increased thermal stability and also an increased mechanical strength, and, namely, it is a matter here of the aramides belonging to the group of the polyamides. A fabric of an aramide would, to be sure, be extremely well suited for the bands of a slat conveyor belt, but in actual practice it is not possible to produce the holes in the bands required for the spraying of the transport and rest ribs mechanically or thermally, so that a use of these highly stable aramides was not hitherto possible.

In further development of the invention it is provided that the belt, which contains two holes per transport rib, so that two rows of holes parallel to its edges are formed, consists of a fabric of polyester formed of warp and weft threads, into which additionally there are embedded warp threads of a polyamide belonging to the group of the aramides, and that the polyamide warp threads are absent in the zones of the bands running in longitudinal direction in which the rows of holes are located. In this manner it is possible to achieve a high tensile strength of the bands, without the introduction of the holes being hampered.

The invention is explained in detail i the following with the aid of an example of execution represented in the drawing. In the drawing.

Figure 1:
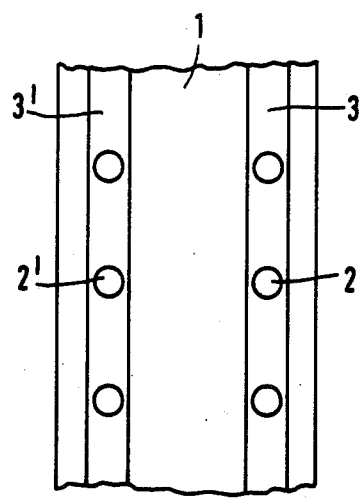
FIG. 1 shows a cut-out of the belt in plan view.

FIG. 1 shows in plan view a section of a band 1 to which the transport strips and rest strips are applied. In the belt 1, parallel to the side edges, there are arranged two rows of holes 2 and 2', in which in each case two adjacently lying holes 2 and 2' form a pair which serves for the anchoring of the transport rib and of the appertaining rest rib. The arranging of the transport ribs and rest ribs on the belt 1 occurs in an injection molding mold, after the holes 2 and 2' have first been produced.

The belt 1 consists there of a fabric formed of warp and weft threads, which has a good tensile strength. Aramides, which because of their considerably higher tensile strength would be still better suited, cannot be used in the spraying-on of the ribs, however, because the aramides by reason of their mechanical properties and their high thermal stability do not permit a making of the holes by a stamping or welding process.

In order, however, nevertheless to be able to utilize the high thermal strength of the aramide, there are additionally embedded into the polyester fabric warp threads of a polyamide belonging to the group of aramides, the polyamide warp threads, however, being absent in the zones 3 and 3' running in longitudinal direction, in which the hole rows 2 and 2' are located, so that the holes can be made without problems.

Figure 2:
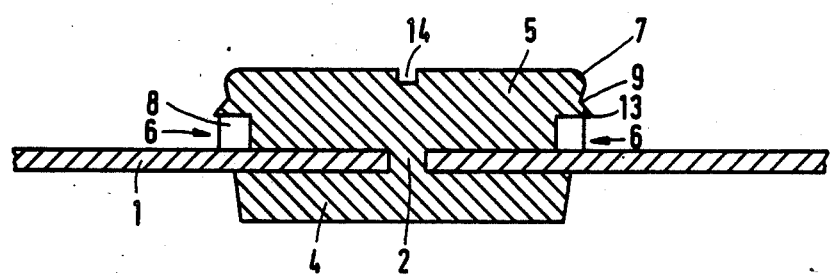
FIG. 2 shows a cross section representation through a section of a band with an element applied to it consisting of transport rib and rest rib.

FIG. 2 shows in cross section a unit sprayed onto the band, consisting of transport rib 4 and rest rib 5. The ribs 4 and 5 are connected with one another only in the zone of the holes 2, but by the spraying process there is additionally established an adhesion between the ribs on the one hand and the belt on the other hand, because the fabric is structured on its upper side.

The rest ribs 5 are provided on both sides on their entire length with first rest grooves 6 bordering on the belt 1, so that above these rest grooves 6 there are formed rest lugs 7. On the bottom of the rest grooves 6 there is provided at least one raised part 8 running out into a sharp edge, the edge running perpendicularly to the sidewalls of the groove. Preferably several such raised parts are provided spaced from one another.

Above the rest grooves 6, there is arranged in the rest lugs 7 on both sides in each case a second rest groove 9, the depth of which is less than the depth of the first rest grooves 6.

Figure 3:
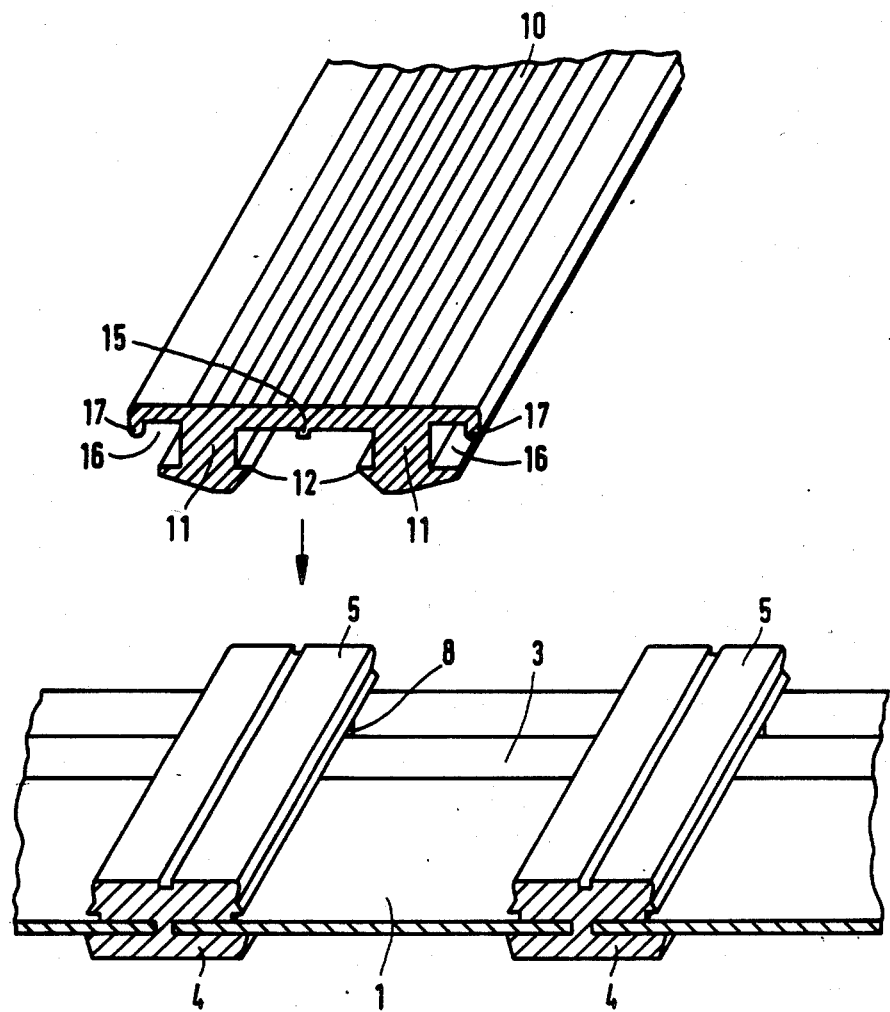
FIG. 3 shows a perspective representation of a cut-out of the belt with two transport and rest ribs applied to it and a not yet emplaced section of a slat.

FIG. 3 shows in the upper region the formation of a slat 10 emplaceable on the rest strip 5. The slat presents on its underside continuous crosspieces 11 running in a longitudinal direction, on the lower end of which in each case there is arranged an inward-pointing projection 12. The crosspieces 11 with the projections 12 are arranged and dimensioned in such a way that the slats are emplaceable from above over the rest lugs 7 into the rest grooves 9 and 6. In order to facilitate the setting in place, the projections 12 are beveled on their underside, and likewise the upper edges of the rest lugs 7 are sloped or rounded. The fastening of the slat to the appertaining rest rib occurs in such a way that first by slight pressure the projections 12 pass into the second rest grooves 9. Since these rest grooves have a relatively shallow depth, the resistance against a longitudinal shifting of the slat is relatively slight, so that this can be thrust without great exertion of force into the position that it is finally to occupy. Then the slat 10 by further pressure from above is brought into its final position, in which the projections 12 snap over the lower edge 13 of the rest lugs 7 into the rest grooves 6. This snapping-in occurs rather violently, since the crosspieces elastically bent apart on passing the edges 13 are abruptly unburdened. Since the projections 12 run out into sharp edges, these sharp edges strike in the process upon the sharp edges of the raised parts 8 in the rest groove 6, so that the colliding sharp edges are deformed and bring about a fixing of the slat in the longitudinal direction.

Additionally, there can further be arranged in the upper side of the rest rib 5 a rectangular groove 14 running centrally in longitudinal direction, with which a corresponding shaped spring 15 comes into engagement on the underside of the slat 10 when the slat is moved out of the rest grooves 9 into the rest grooves 6. This tongue-and-groove connection provides additionally for a stable positioning of the slat on the rest rib 5. In addition to or also instead of the raised parts 8 on the bottom of the groove 14 or on the underside of the spring there can be provided raised parts running out into a point, which provide for the fixing of the slat in its longitudinal direction.

The slats 10 consist preferably of antistatic polyamide which is reinforced by transversely and/or longitudinally oriented glass fibers.

It is evident that with the strip-form construction of the rest ribs 5, despite the slender form, there can be achieved a sufficient hold, so that the construction height altogether can be kept low.

The slat 10 represented has on its sides in each case a longitudinal groove 16, which is partially closed by a lip 17 facing downward from the surface of the slat 10. The longitudinal grooves serve in a known manner to arrange cover elements between adjacent slats, which cover elements can be slid with fitting profiles into the grooves 16.

On their upper side, the slat 10 are provided with a transverse and/or longitudinal corrugation, in order to increase the adhesive friction for the material conveyed.

The construction of the belt 1 of a polyester fabric with warp threads of an aramide additionally restricted to certain zones was described, to be sure, with the aid of the example represented of a slat conveyor belt, but this construction of the belt is not restricted of the example of execution described, but a use of it is always possible when the tensile strength of a belt is to be increased, but by the aramide material a mechanical or thermal treatment of the belt in desired longitudinal zones is not to be hampered.

What is claimed is:

1. In a flat conveyor belt for slat conveyors having a plurality of endless belts operationally arranged in parallel spaced relationship, transverse equally spaced transport ribs secured to the inner surface of said belts, said ribs being operationally engageable by complementary grooves in at least one driven transport roller, and transverse rest elements integral with said transport ribs and projecting through holes in said belts to the outer surface of said belts, slat positioning means on said rest elements comprising rest ribs having side rest grooves extending over the entire transverse length thereof and providing outer rest lugs, elongated slats cooperable with said positioning means comprising a pair of spaced longitudinal crosspieces depending from the bottom surface thereof, a longitudinal projection, on each of said crosspieces to provide a pair of opposed projections, said crosspieces and projections being arranged and dimensioned so that the slats are fittable over the rest lugs from above said rest grooves, and a plurality of sharp raised parts integral on said slats or said rest ribs which when operationally press-fitted engage the associated opposed part to secure the slat against longitudinal movement.

2. Slat conveyor belt according to claim 1, characterized in that in the rest ribs above the rest grooves in the rest lugs there is provided in each case a second rest groove the depth of which is less than the depth of the first rest groove.

3. Slat conveyor belt according to claim 2, characterized in that the distance of the second rest groove from the first rest groove is so dimensioned that in the fitting of the slat into the second rest grooves the raised parts still lie free.

4. Slat conveyor belt according to claim 3, characterized in that on the bottom of the first rest grooves there is provided in each case at least one raised part running out into a sharp edge, the edge running perpendicular to the sidewalls of the groove.

5. Slat conveyor belt according to claims 1, 2, 3, or 4, characterized in that on the upper side of the rest ribs there is provided in each case centrally and parallel to the longitudinal extension a groove into which there engages a spring arranged on the underside of the slat between the crosspieces.

6. Slat conveyor belt according to claim 5, characterized in that the raised parts are arranged in the groove or the spring.

7. Slat conveyor belt according to claims 1, 2, 3, or 4, characterized in that associated transport ribs and rest ribs consist in each case of a single plastic part which is produced by an injection process by placing the band previously provided with holes into a mold.

8. Slat conveyor belt according to claim 7, characterized in that the belt for each plastic part there are provided two holes, so that there are formed in the belt rows of holes parallel to its edges.

9. Slat conveyor belt according to claim 8, characterized in that the belts to which the transport ribs and the rest ribs are to be fastened consist of fabric formed of warp and weft threads of polyester fibers, into which there are additionally introduced warp threads of a polyamide belonging to the group of aramides, and that the polyamide warp threads are absent in the zones running in the longitudinal direction of the belts in which the hole rows are present.

10. Slat conveyor belt according to claims 1, 2, 3, or 4, characterized in that the slats consist preferably of antistatic polyamide with transversely and/or longitudinally oriented glass fiber inlay.

11. Slat conveyor belt according to claim 10, characterized in that the slats present a longitudinal and/or transverse corrugation.

12. Slat conveyor belt according to claim 11, characterized in that the slats present in a manner known per se extruded grooves on their longitudinal sides for the introduction of connecting flat profiles consisting of soft PVC.

* * * * *